Figure 1:
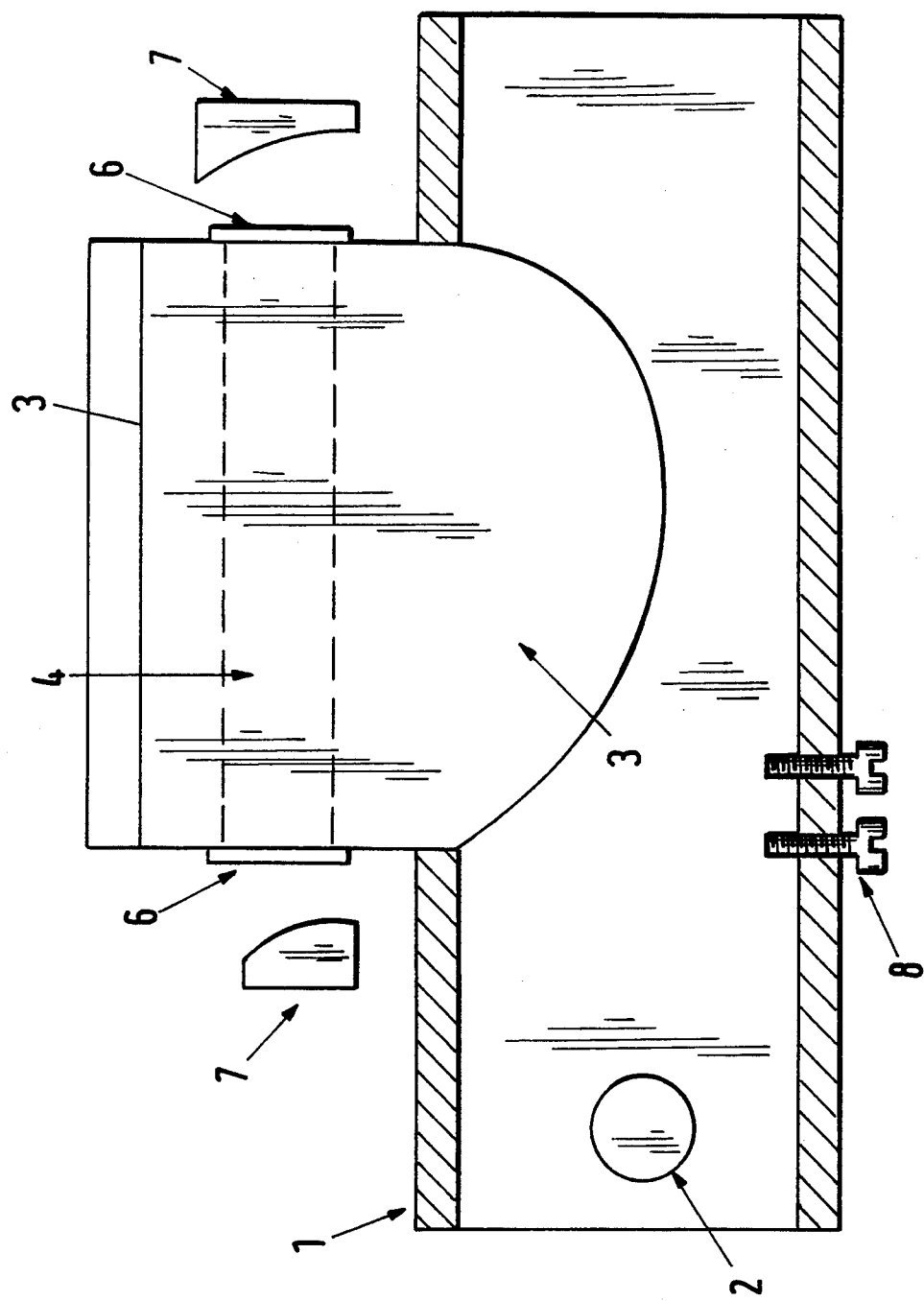

United States Patent [19]
Suessmuth et al.

[11] Patent Number: 5,400,357
[45] Date of Patent: Mar. 21, 1995

[54] GAS LASER IN PARTICULAR $CO_2$ LASER

[76] Inventors: Norbert Suessmuth, Heinrichstrasse 16, D-38106 Braunschweig; Jeng-Ming Wu, Am Schlossgarten 8, D-38100 Braunschweig, both of Germany

[21] Appl. No.: 175,378
[22] PCT Filed: Jul. 10, 1992
[86] PCT No.: PCT/DE92/00576
  § 371 Date: Jan. 12, 1994
  § 102(e) Date: Jan. 12, 1994
[87] PCT Pub. No.: WO93/02494
  PCT Pub. Date: Feb. 4, 1993

[30] Foreign Application Priority Data
Jul. 16, 1991 [DE] Germany .................. 41 23 470.7

[51] Int. Cl.⁶ ............................................. H01S 3/097
[52] U.S. Cl. ........................................ 372/82; 372/64; 372/92; 372/76; 372/97; 372/34
[58] Field of Search ....................... 372/92, 55, 95, 98, 372/69, 64, 76, 97, 34

[56] References Cited

U.S. PATENT DOCUMENTS 4,987,577  1/1991  Seunk et al. ..................... 372/82

FOREIGN PATENT DOCUMENTS 0280044  8/1988  European Pat. Off. .
0392485  10/1990  European Pat. Off. .

*Primary Examiner*—Léon Scott, Jr.
*Attorney, Agent, or Firm*—Foley & Lardner

[57] ABSTRACT

A gas laser, in particular a $CO_2$ laser, contains as laser medium a gas that is excited into a plasma by a HF energy supply, in particular a microwave energy supply, whereas the HF waves are coupled into the laser medium (4) through a rectangular waveguide (1). In order to obtain a compact structure with an efficient coupling of the HF energy, coupling is ensured by means of a ribbon-shaped waveguide (3) that projects into the rectangular waveguide (1) and thus also allows the outcoupling on all sides of the rectangular waveguide.

26 Claims, 17 Drawing Sheets

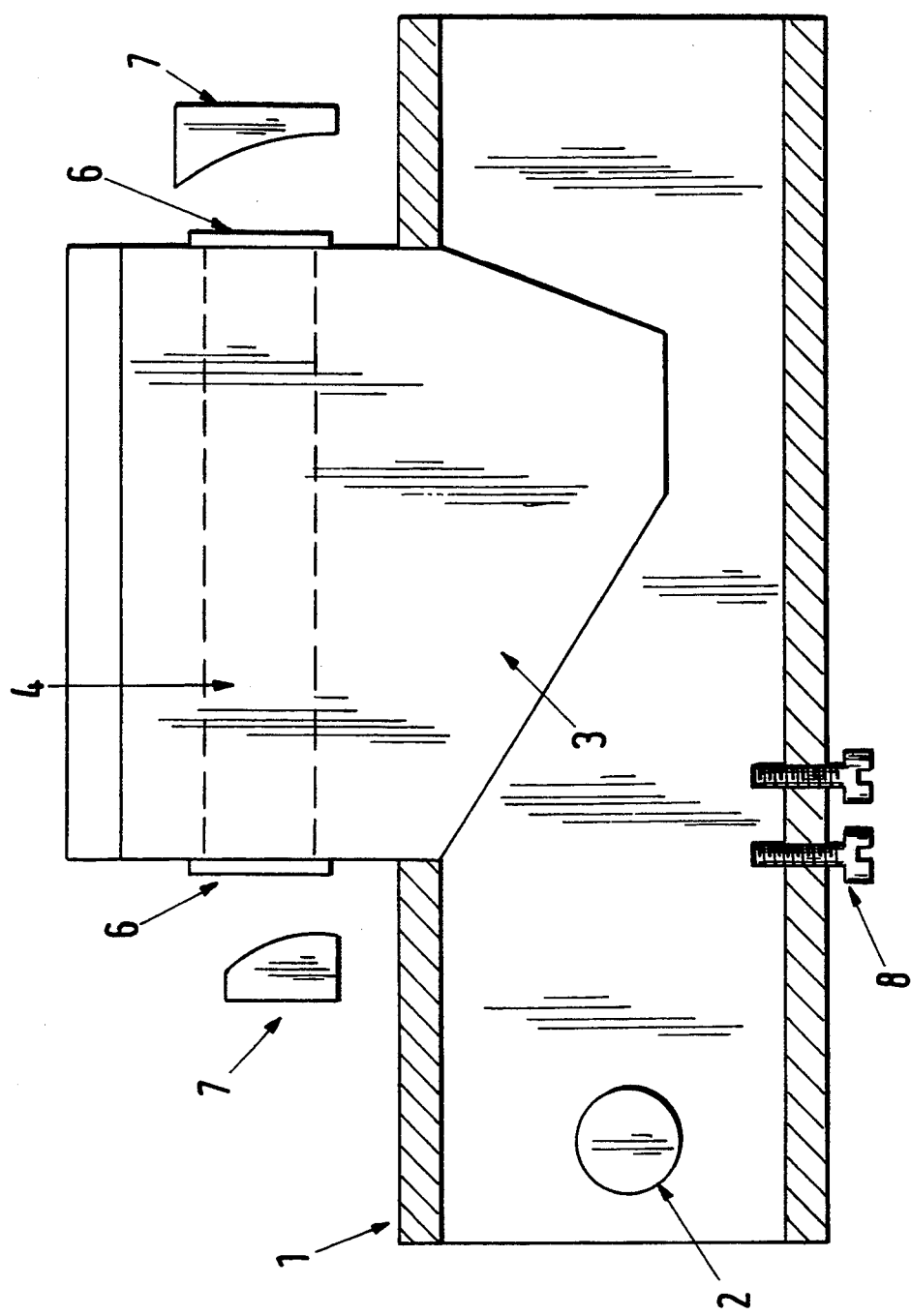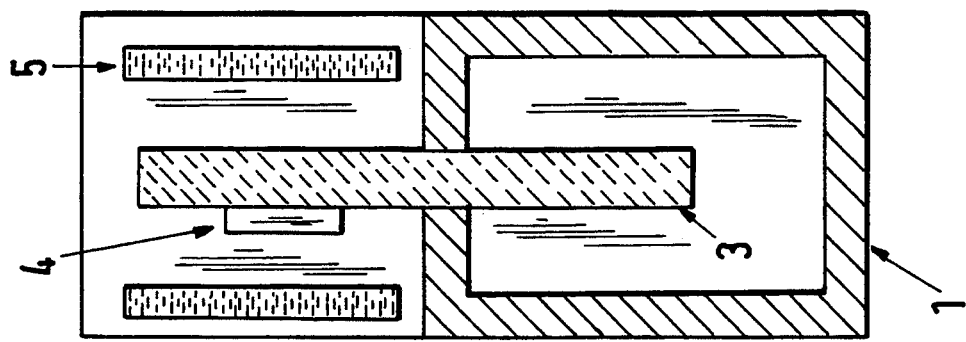

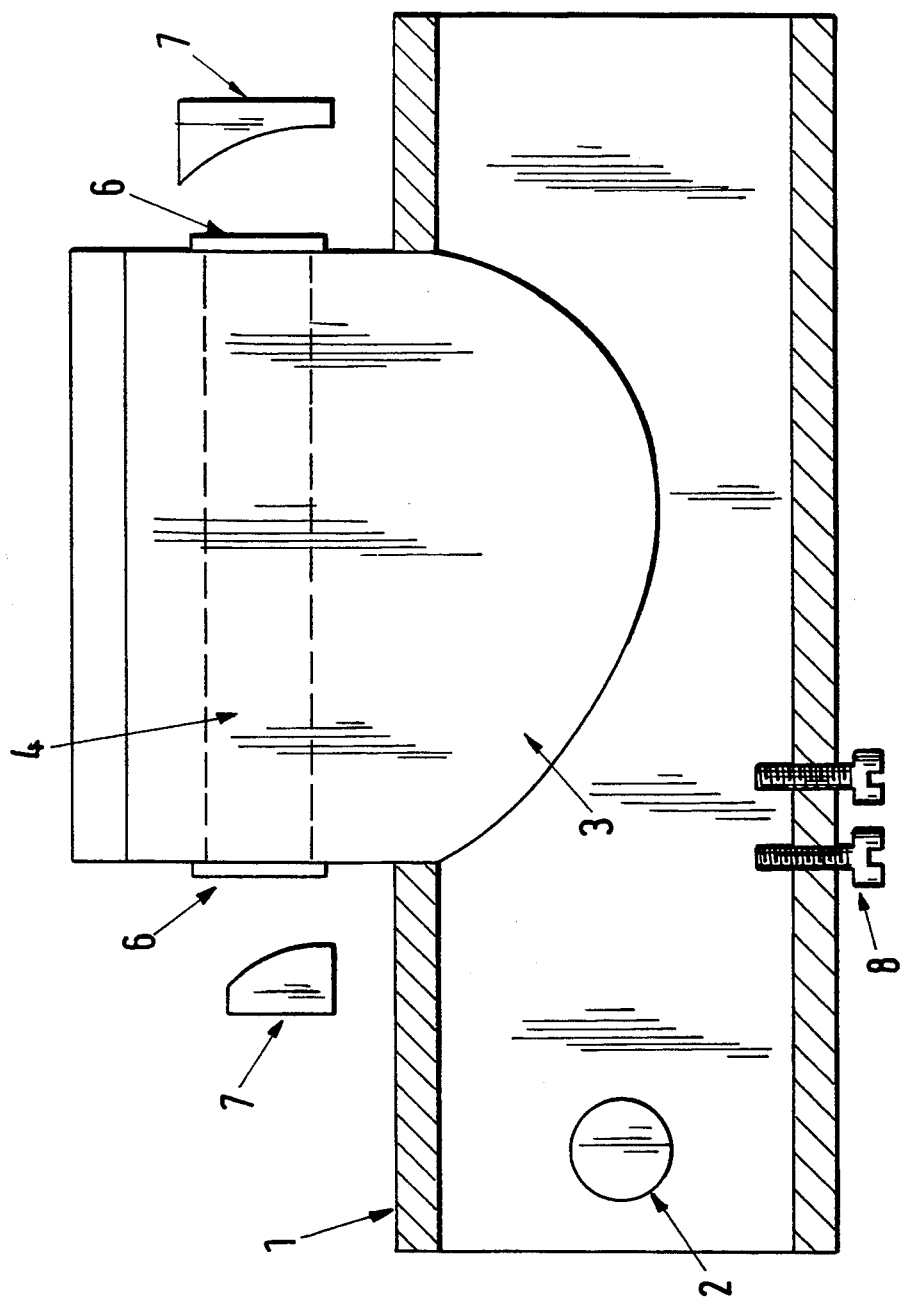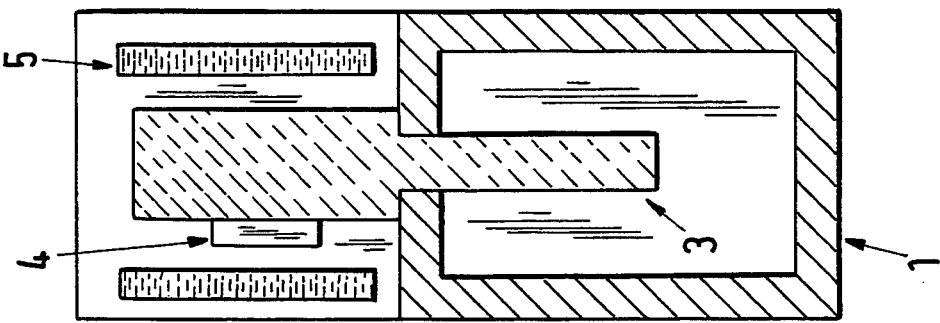

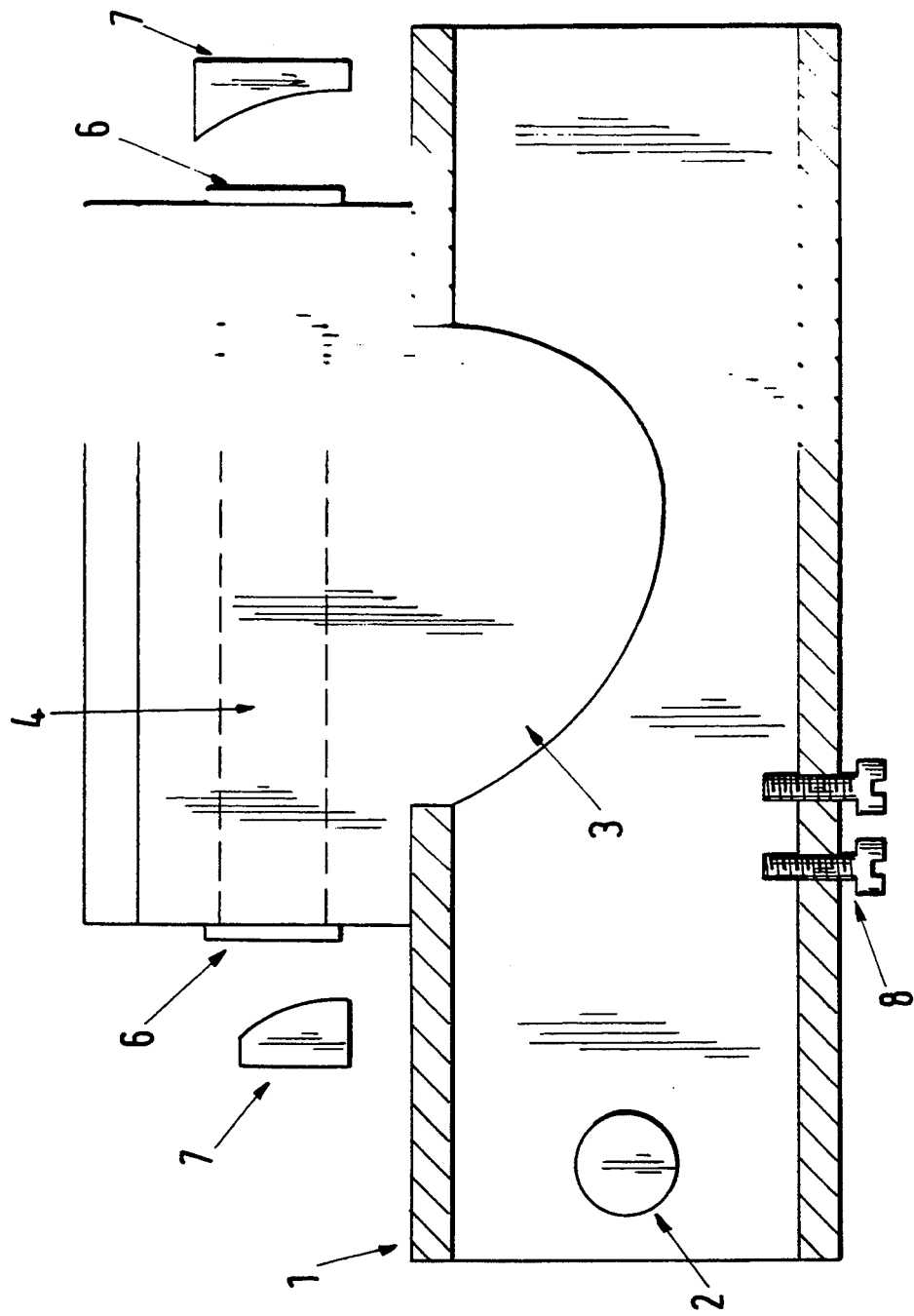
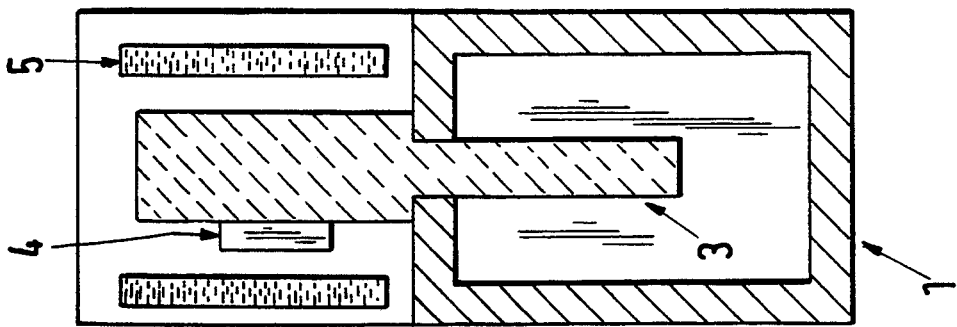

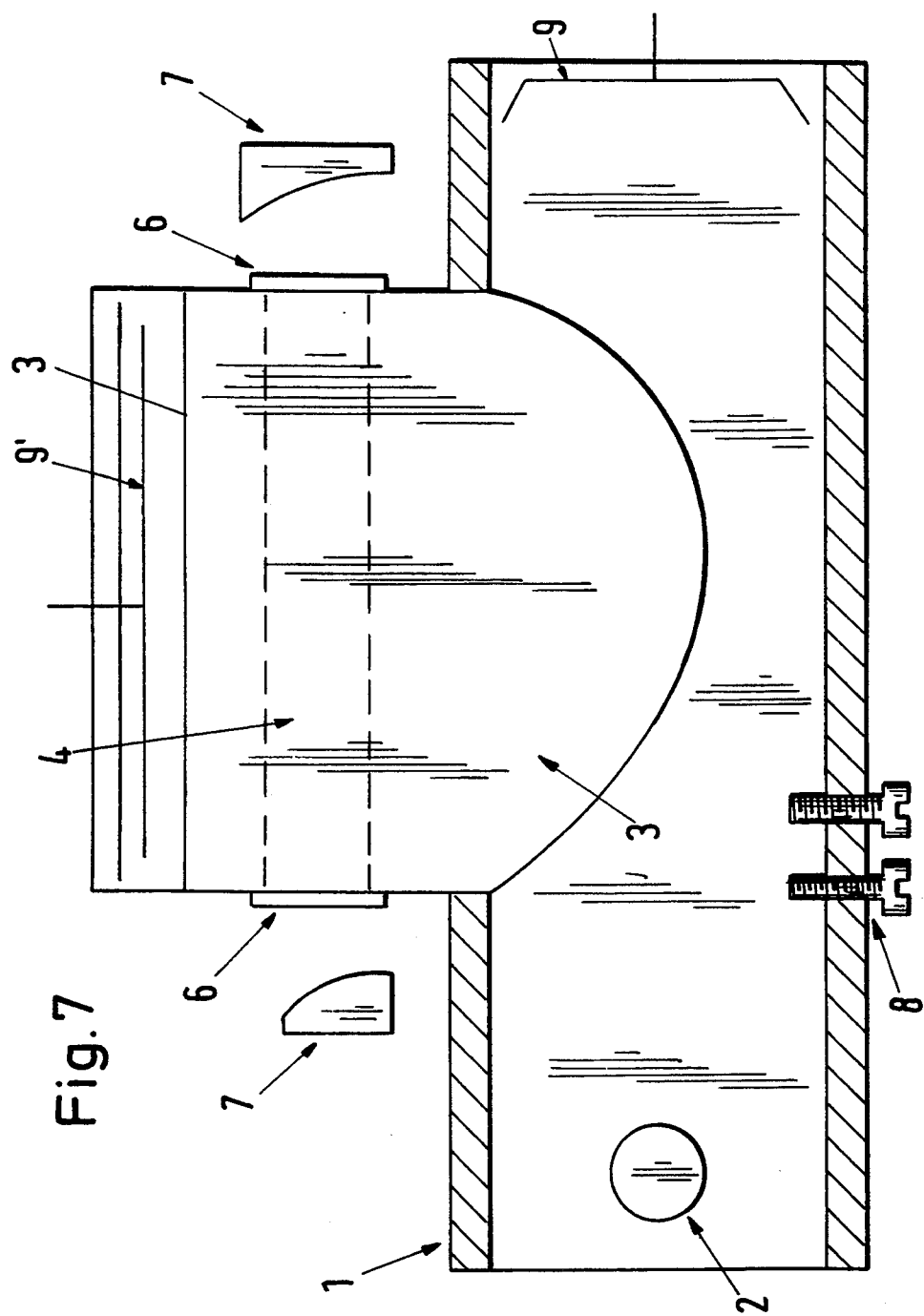

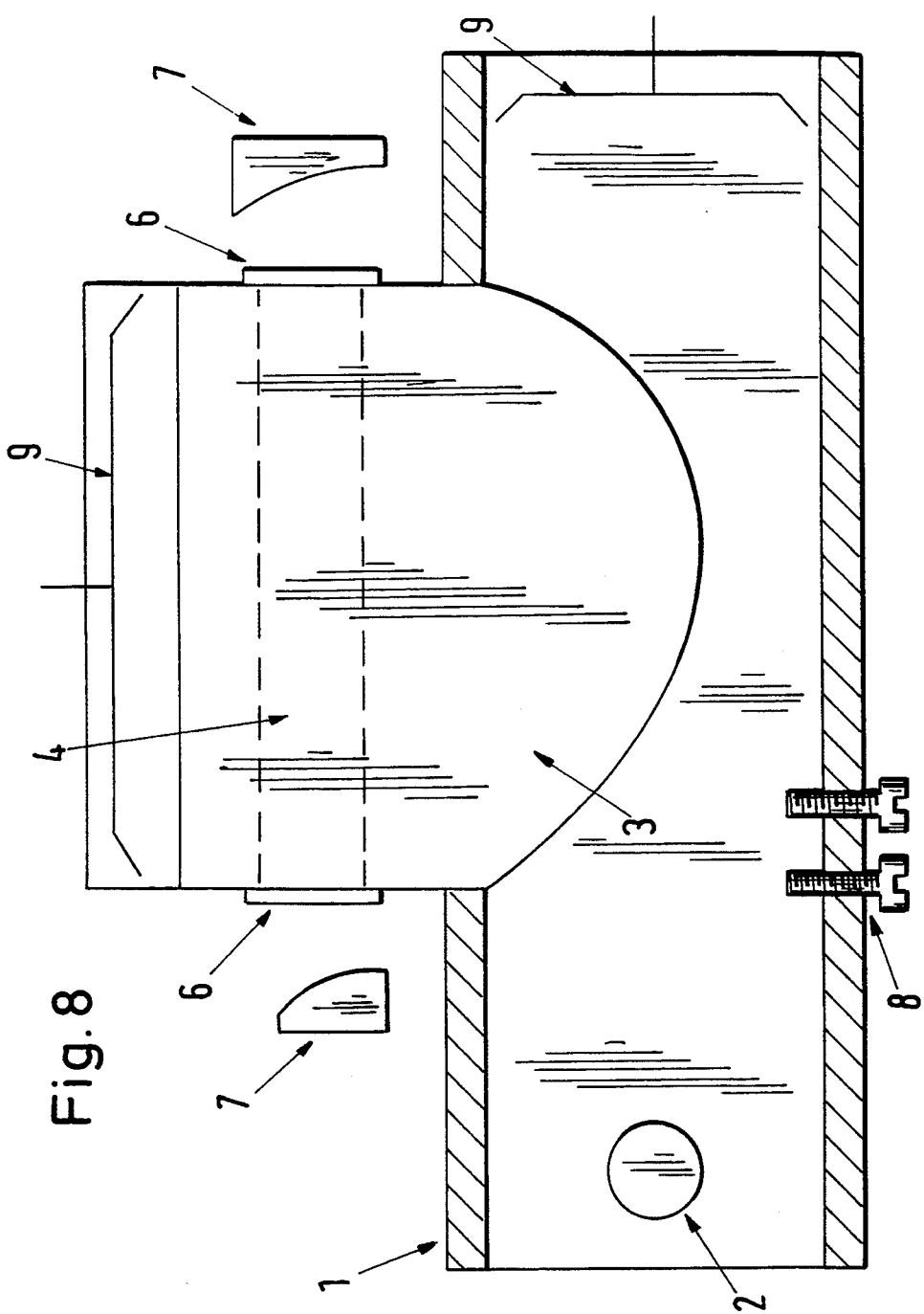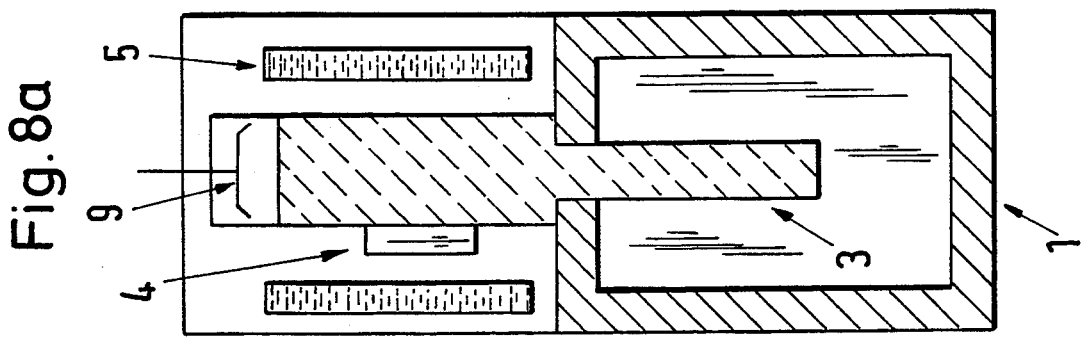

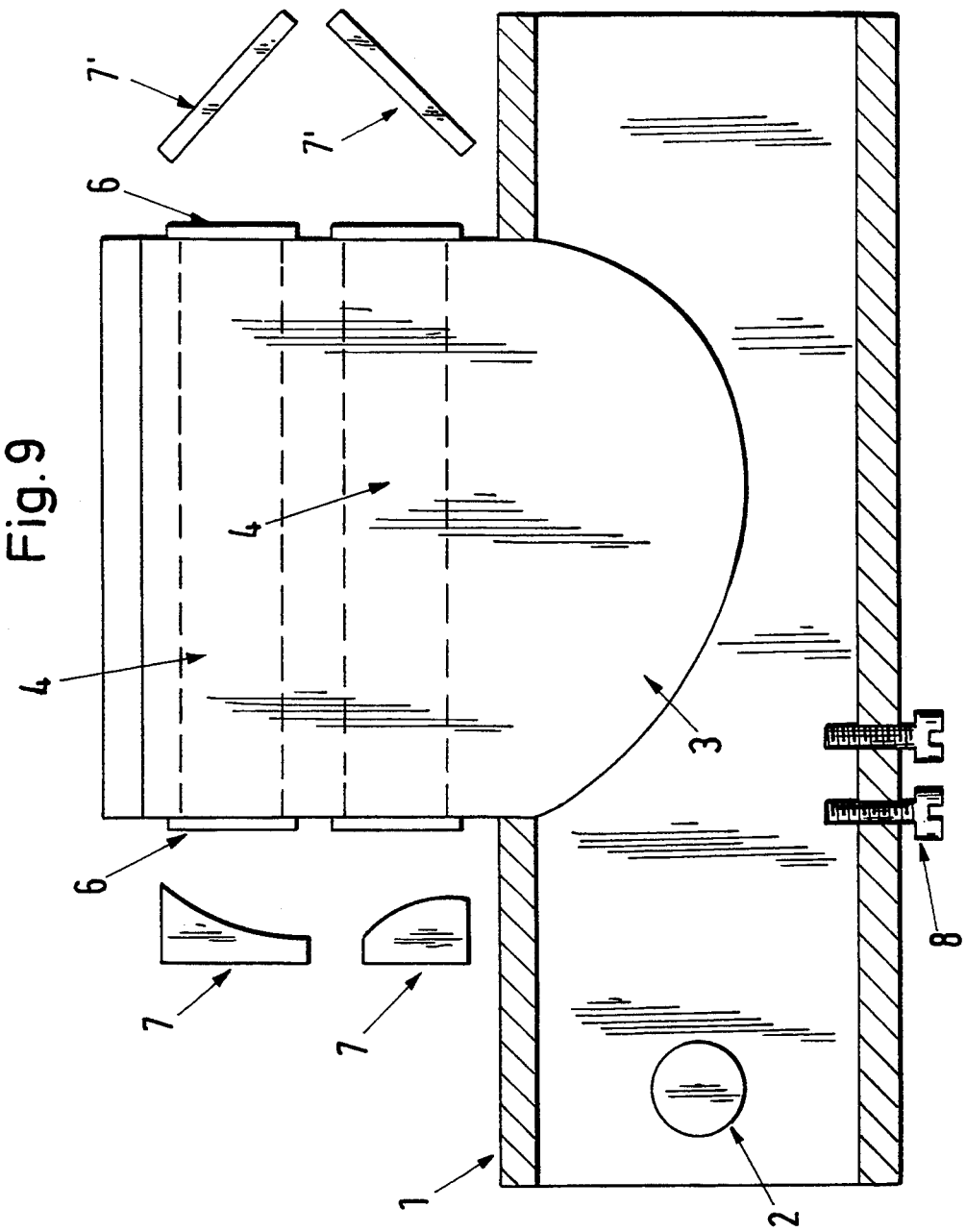

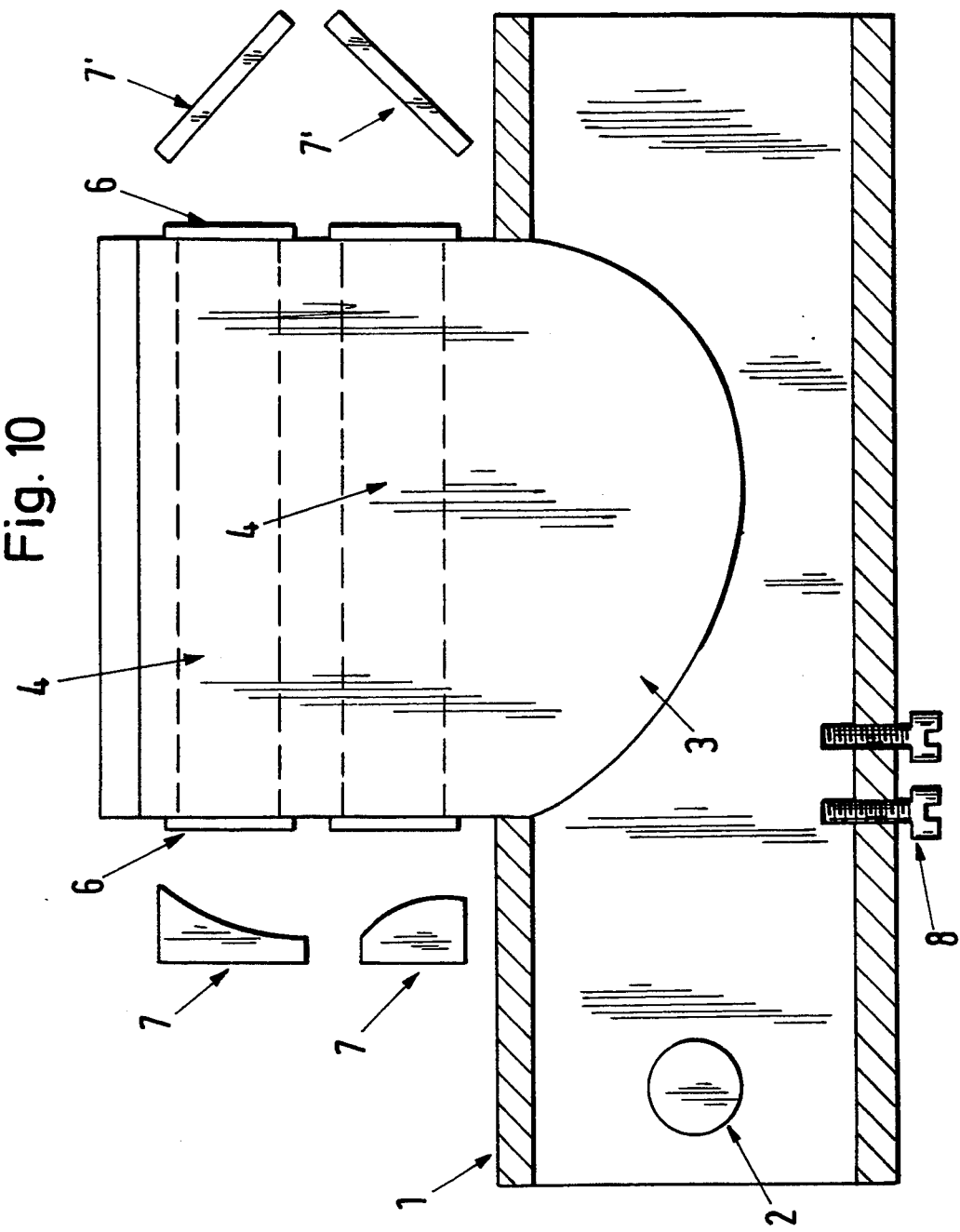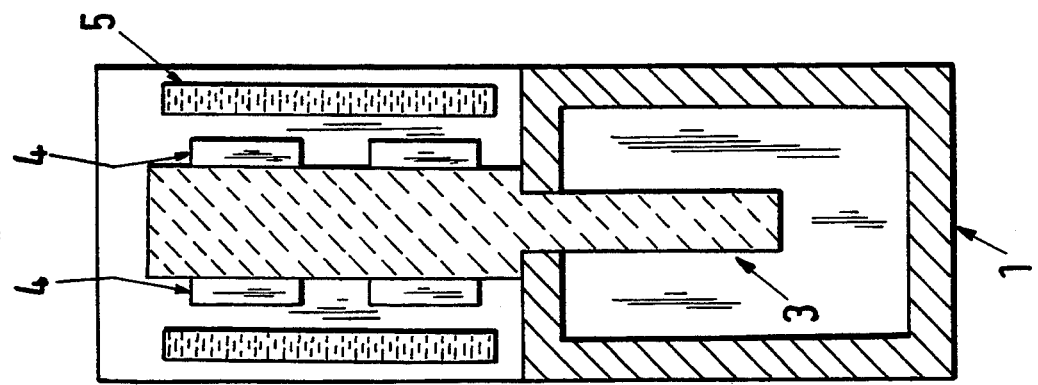

Fig. 12a
Fig. 12b
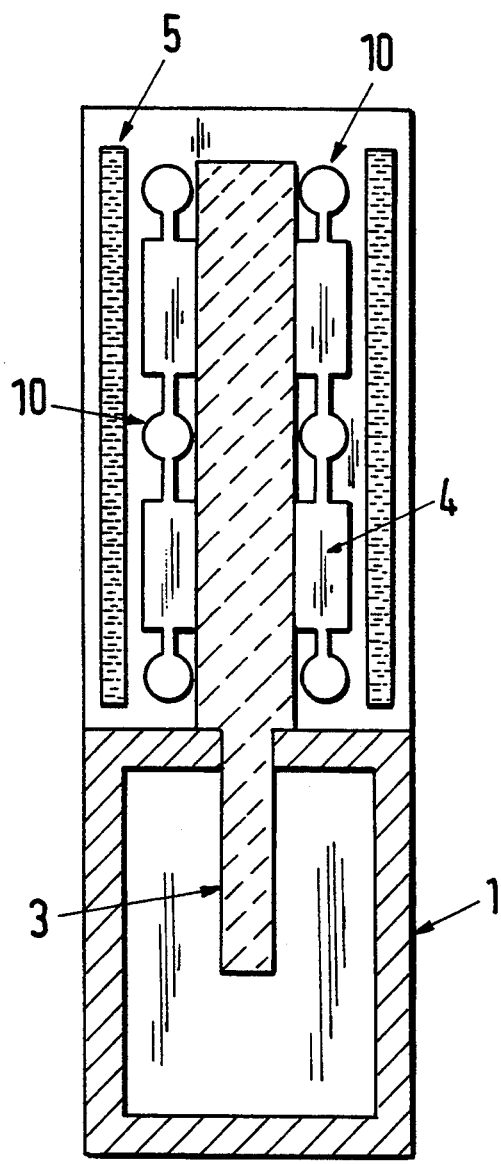
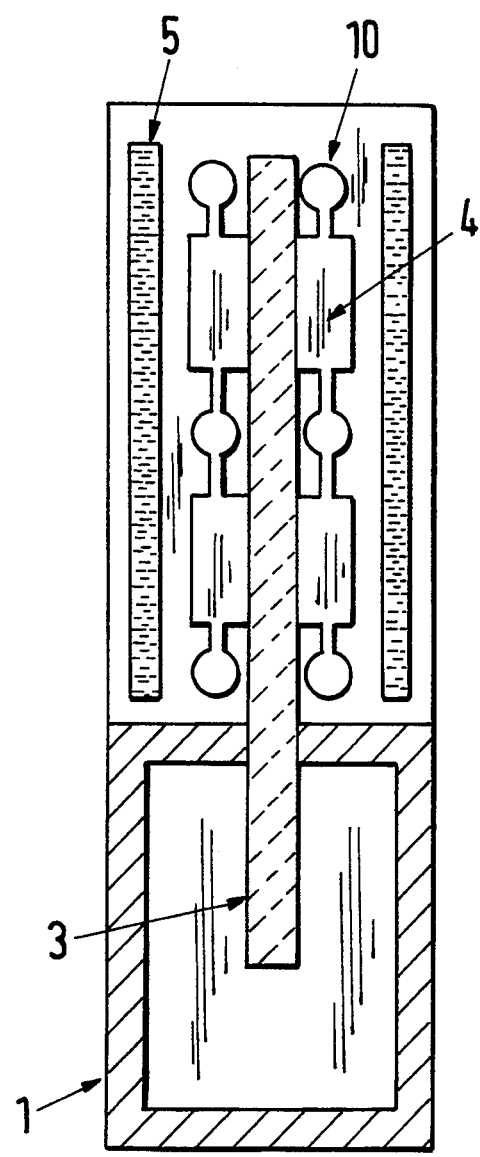

GAS LASER IN PARTICULAR CO2 LASER

DESCRIPTION

Gas laser, in particular $CO_2$ laser

The invention relates to a gas laser, in particular $CO_2$ laser, having as laser medium a gas which is excited to form a plasma by the supply of RF power, in particular in the form of microwave energy, the RF waves being coupled into the laser medium from a rectangular waveguide.

In principle, the excitation of the laser medium to form a photon-emitting plasma can be performed by applying an electric field, which can be a direct or alternating field. In the course of the development of gas lasers, the advantages due to excitation by means of radio-frequency power have become ever clearer. The exciting frequency can reach in this case as far as into the microwave region.

Various techniques are known for coupling the radio-frequency power into the gas plasma. In the case of a so-called ribbon conductor laser, the laser medium is located between opposite surfaces of two wall parts which are simultaneously constructed as electrodes and for the coupling in of the energy. Since there forms along the two plasma-bounding surfaces of the ribbon conductor electrodes a boundary layer which contributes only a little or not at all to the generation of the laser radiation, the achievable laser output power is limited.

It would be conceivable to increase the exciting frequency, since the thickness of the boundary layers in the plasma decreases with increasing exciting frequency. The satisfactory attainment of an exciting frequency in the MHz region has not been possible using the previous ribbon conductor lasers.

A gas laser of the type mentioned at the beginning has been disclosed in EP 0,280,044 A2. This reference describes a gas laser in which microwave energy is laterally coupled into the laser medium from a rectangular waveguide with a gradual transition. Not only does this technique require a relatively large amount of space, but it also does not permit a high efficiency for the coupling in of the microwave energy.

It is therefore the object of the invention to permit a compact structure and a high efficiency for the coupling in of the RF power in a gas laser of the type mentioned at the beginning.

This object is achieved according to the invention by means of a gas laser of the type mentioned at the beginning by coupling in with the aid of a ribbon-shaped waveguide which projects into the rectangular waveguide.

The ribbon-shaped waveguide in this case ensures lateral coupling of the RF power into the plasma discharge chamber, it being the case that it can itself form the end electrodes of the discharge chamber. In a preferred embodiment, the coupling of the RF waves into the laser medium is therefore performed over the entire length of the plasma.

The design according to the invention permits a compact structure of the laser, correct coupling also of high exciting frequencies into the plasma, and coupling out on all sides of the rectangular waveguide.

In order to be able to introduce the RF energy, preferably microwave energy, easily into the discharge chamber from the rectangular waveguide, and as few reflections as possible at the joint which is produced by the discontinuity in the rectangular waveguide, the waveguide projects with an asymmetrical shape into the rectangular waveguide, the maximum depth of immersion of the waveguide into the rectangular waveguide being displaced on the length of the waveguide, starting from the middle thereof, towards the end averted from an RF generator.

In a preferred embodiment of such a waveguide, the waveguide has a constant camber which extends from the end nearer the RF generator with a lesser curvature to the maximum point of immersion of the waveguide into the rectangular waveguide than from the maximum point of immersion to the other end. In this case, the waveguide can approximately have the shape of an $e^{-x}$ function.

In an alternative, asymmetrical embodiment, the waveguide extends approximately rectilinearly from the end nearer the RF generator up to the maximum depth of immersion and returns approximately rectilinearly from the maximum depth of immersion to the other end. In this case, the waveguide can project in an approximately triangular shape into the rectangular waveguide, with the result that the maximum depth of immersion is reached at a defined point of the length of the waveguide. However, it is also possible for the maximum depth of immersion to be maintained over a certain length of the waveguide, with the result that it projects approximately in the shape of a quadrilateral into the rectangular waveguide.

The waveguide preferably consists of a dielectrically active material and has a high optical quality. A suitable material is an $Al_2O_3$ ceramic.

In this case, the waveguide preferably has smoothed surfaces with a very low residual roughness.

The housing of the discharge chamber is preferably a metallic housing having empty chambers in which water can circulate for the purpose of cooling. It is ensured in this way that a specific limiting temperature above which the generation of laser photons would rapidly decrease is not overshot in the plasma gas.

The housing preferably consists of aluminum. The three sides of the discharge chamber, which are formed by the housing, can be coated with gold or platinum, or with oxide layers doped with these metals. The coatings act as a catalyst for the proportion of the gas which is decomposed into plasma. The catalyst effects a regeneration of the decomposed gases which have entered into other compounds.

It is possible by means of the design according to the invention for the discharge chamber to be sealed, and for the laser medium not to flow or to have a slow flow.

The discharge chamber is preferably constructed in the form of a slit, the width of the slit being 1 to mm in size.

As the laser gas can preferably be a mixture of $CO_2:N_2:He:Xe$, preferably in the ratio of 10:70:5.

It can be expedient for the purpose of impedance matching to insert a displaceable short circuit at the end of the rectangular waveguide.

The laser is expediently completed by an instable resonator. The frequency of the exciting microwaves can be in the region between 1 GHz and 12 GHz.

The construction according to the invention permits the arrangement of two or more discharge chambers next to or above one another, the laser radiation being guided via deflecting prisms or deflecting mirrors respectively from one discharge chamber to the next.

Figure 1A:
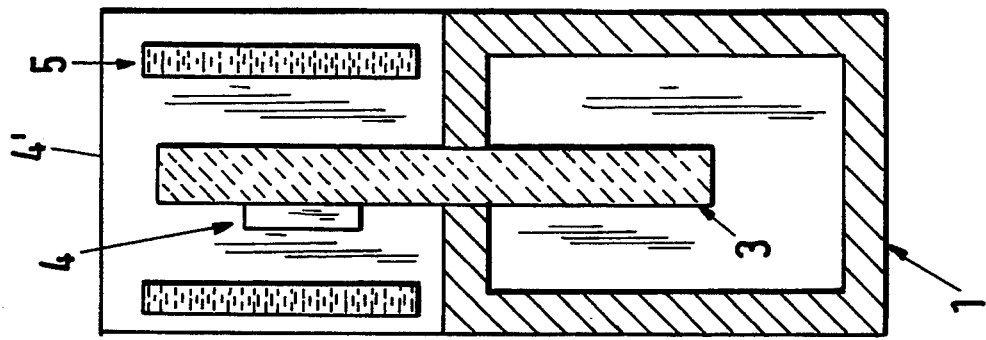
Figure 2:
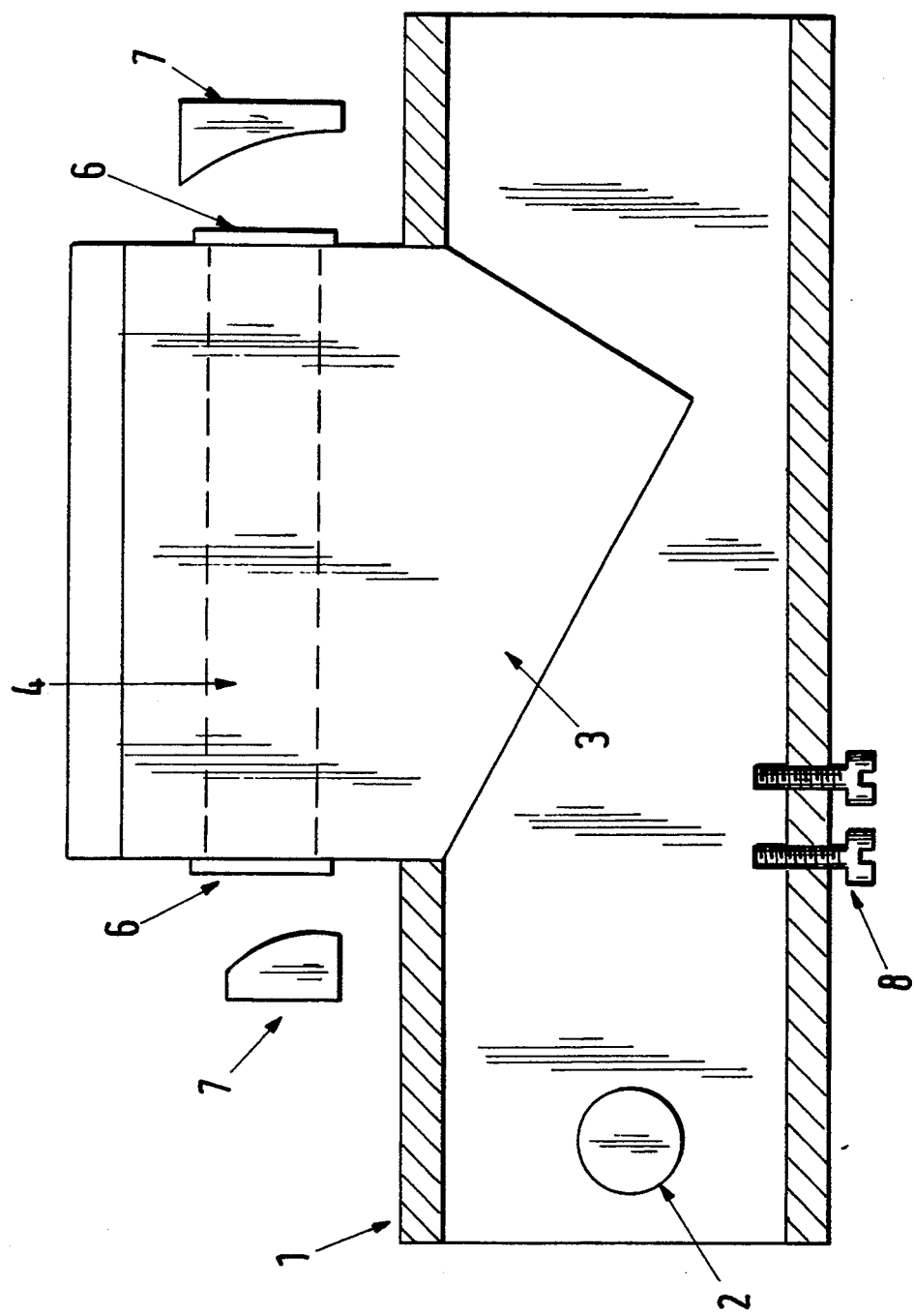
Figure 2A:
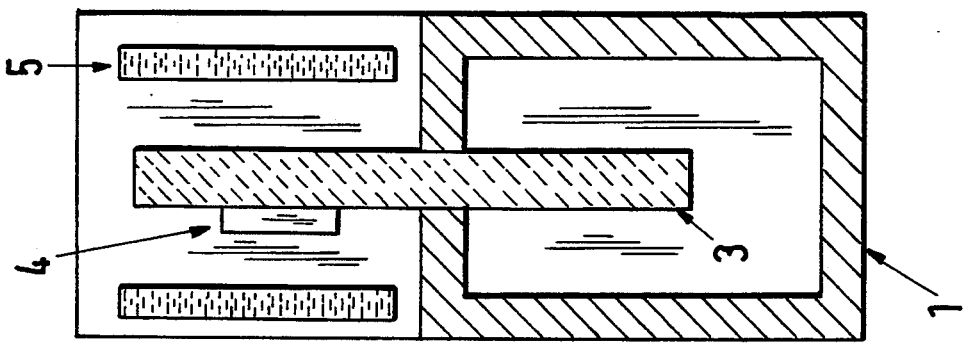
Figure 5:
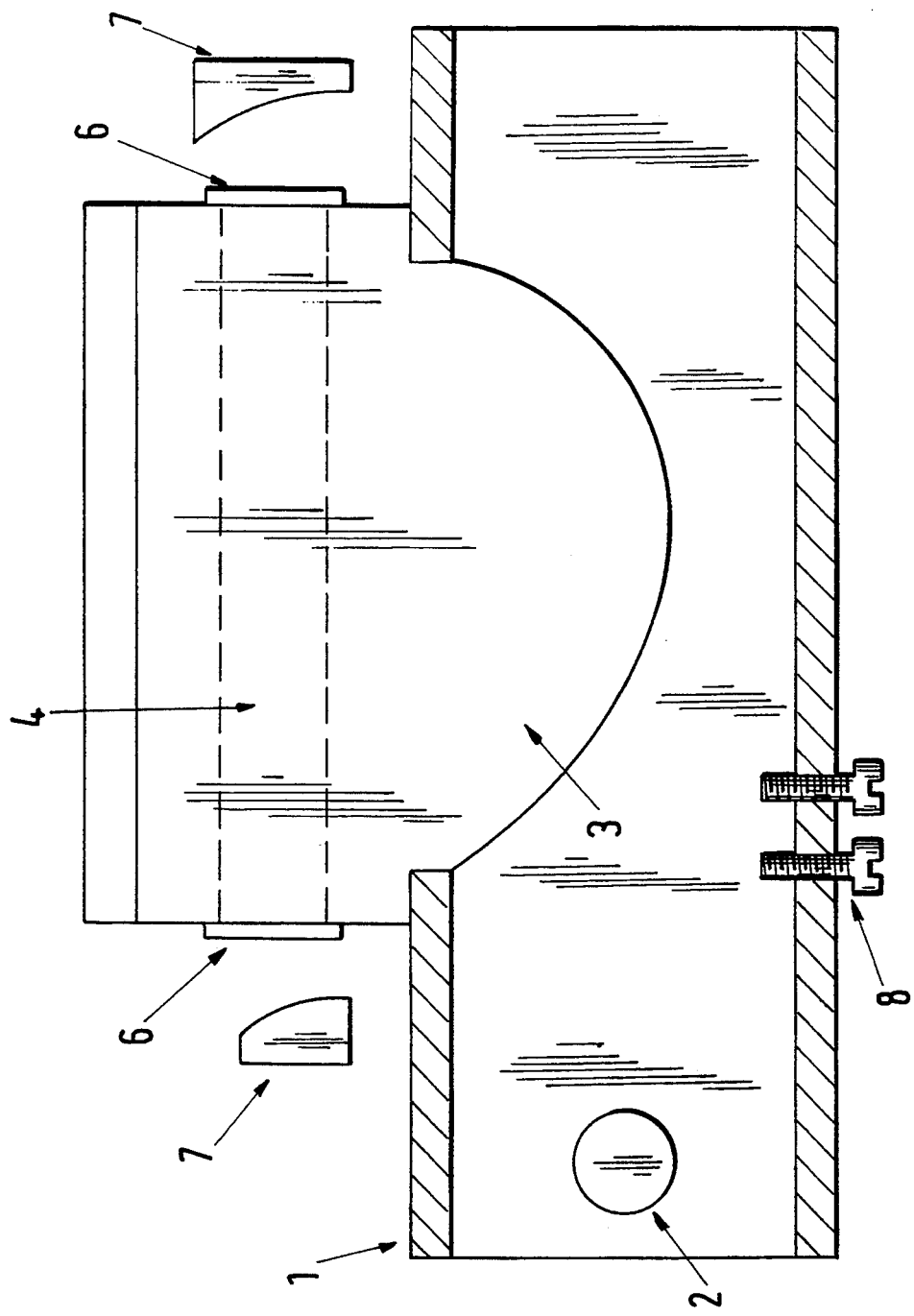

The invention is to be explained in more detail below with the aid of exemplary embodiments represented in the drawing, in which FIG. 1 shows a diagrammatic longitudinal section through a gas laser according to the invention, FIG. 1a shows a diagrammatic cross-section through the gas laser in accordance with FIG. 1, FIG. 2 shows a diagrammatic longitudinal section in accordance with FIG. 1 having a waveguide projecting in a triangular shape into the rectangular waveguide, FIG. 2a shows a cross-section through the laser in accordance with FIG. 2, FIG. 3 shows a longitudinal section through a gas laser in accordance with FIG. 1 having a waveguide which projects approximately in the shape of a quadrilateral into the rectangular waveguide, FIG. 3a shows a cross-section through the gas laser in accordance with FIG. 3, FIG. 4 shows a longitudinal section through a gas laser in accordance with FIG. 1 having a modified waveguide, FIG. 4a shows a cross-section, illustrating the modification of the waveguide, through the laser in accordance with FIG. 4, FIG. 5 shows a cross-section through a gas laser in accordance with FIG. 1, in which the waveguide does not project into the rectangular waveguide over the entire length of the discharge chamber.

Figure 5A:
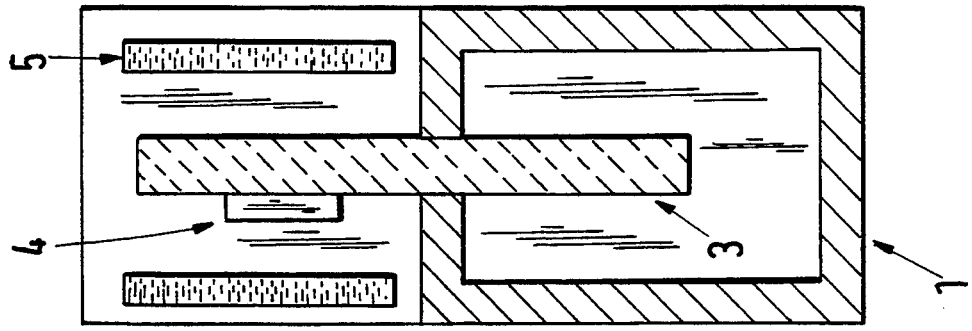
Figure 11B:
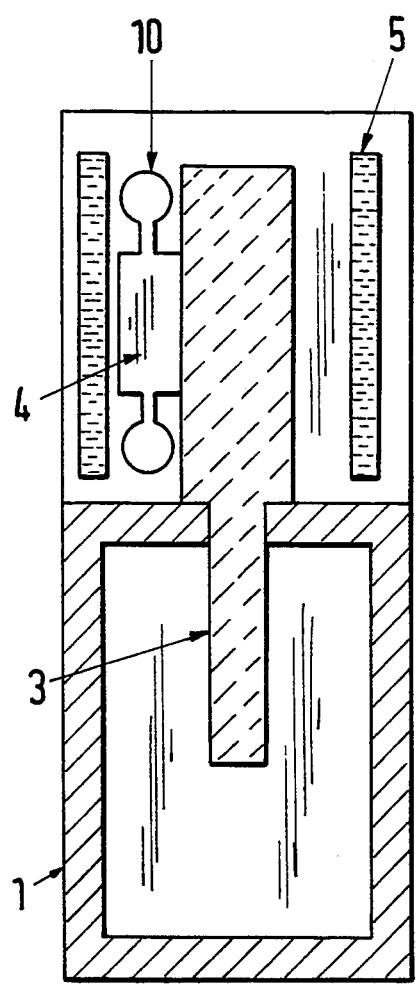
Figure 11A:
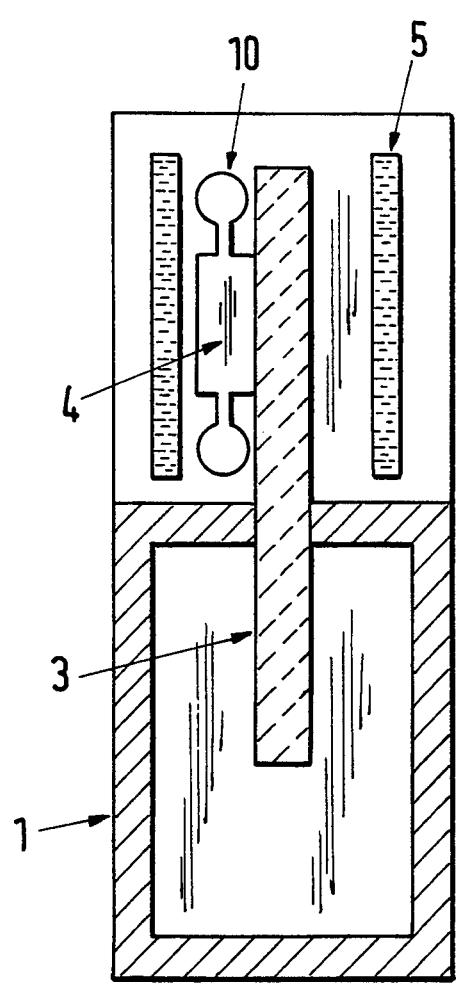
Figure 13:
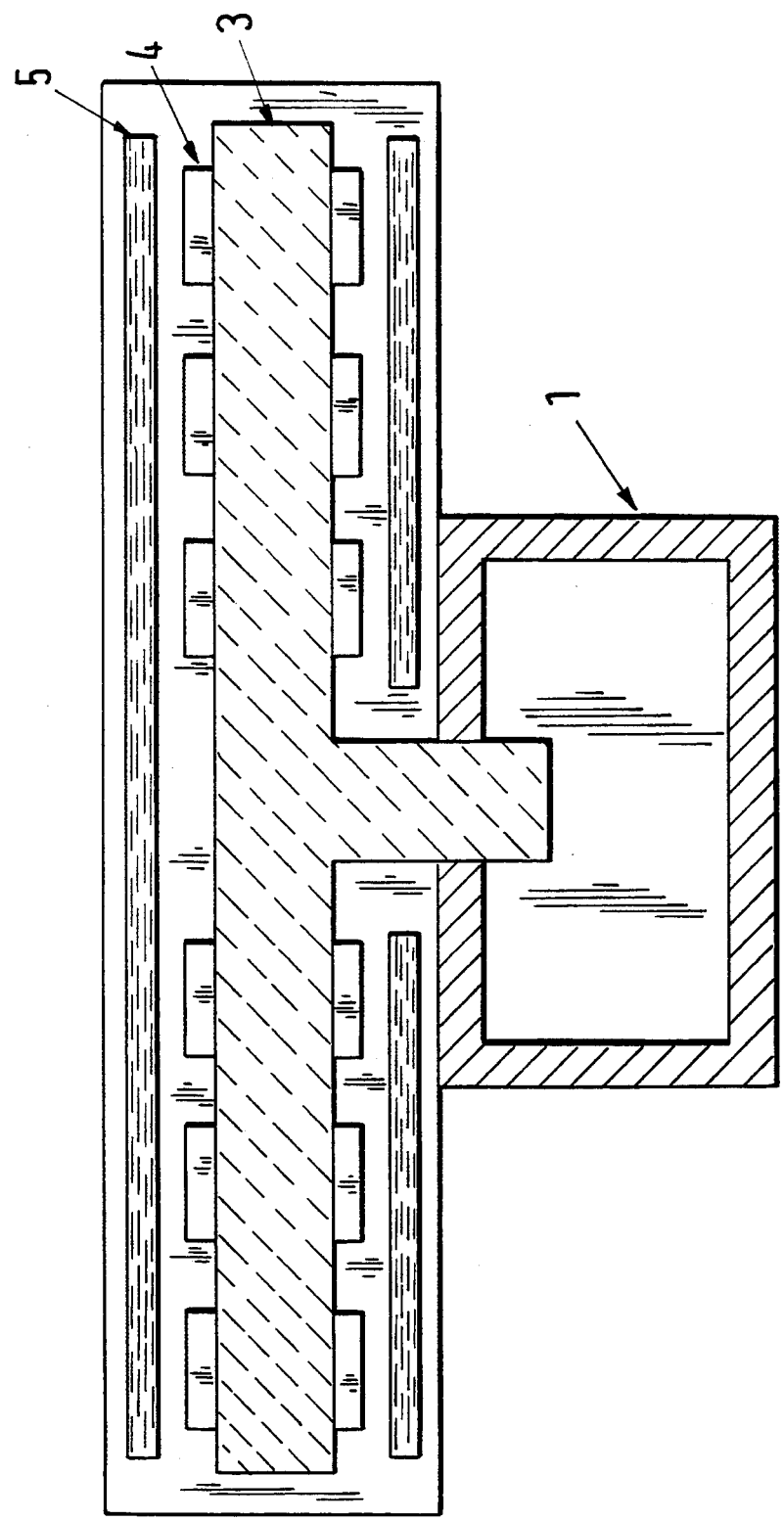
Figure 14:
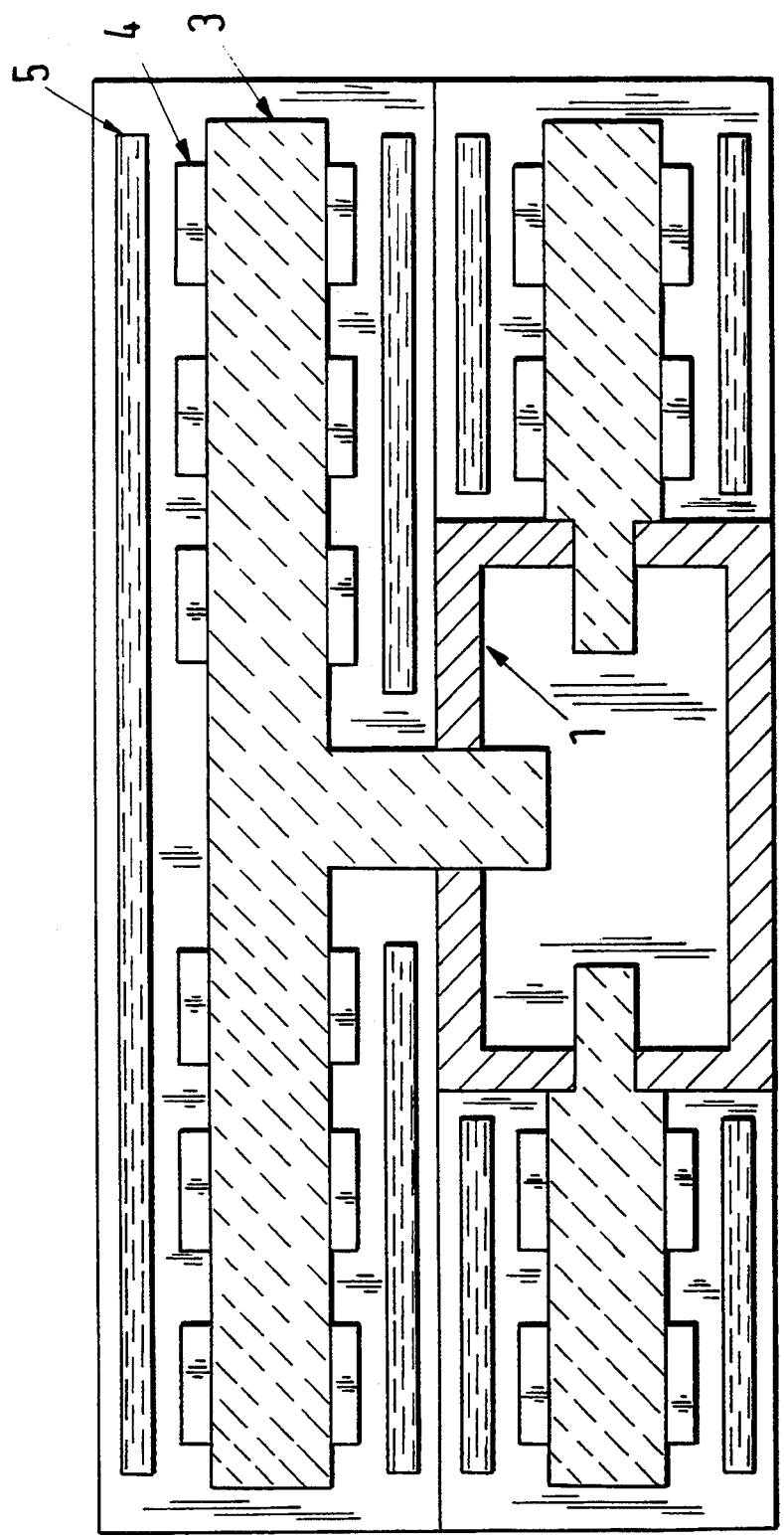
Figure 15:
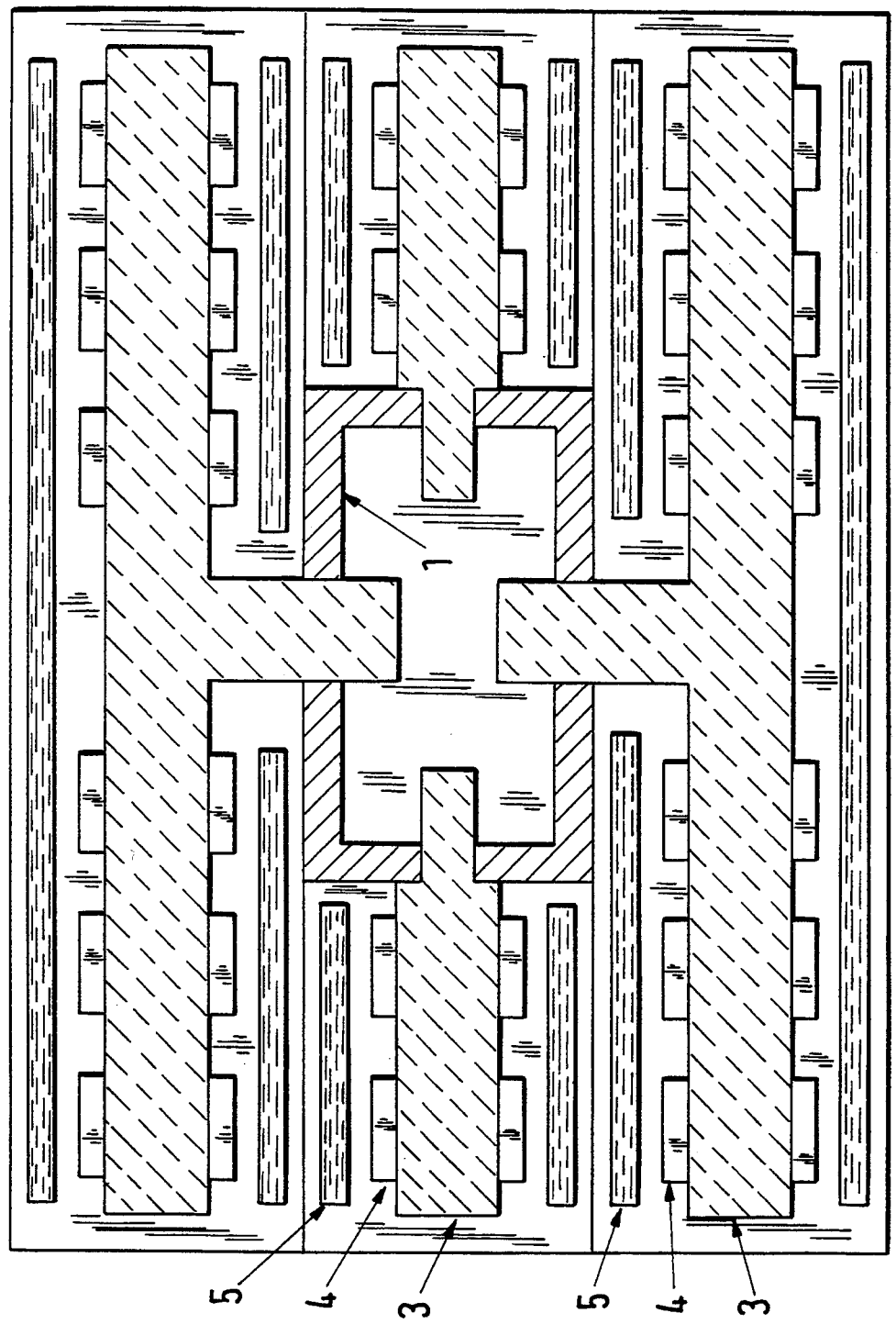
Figure 16:
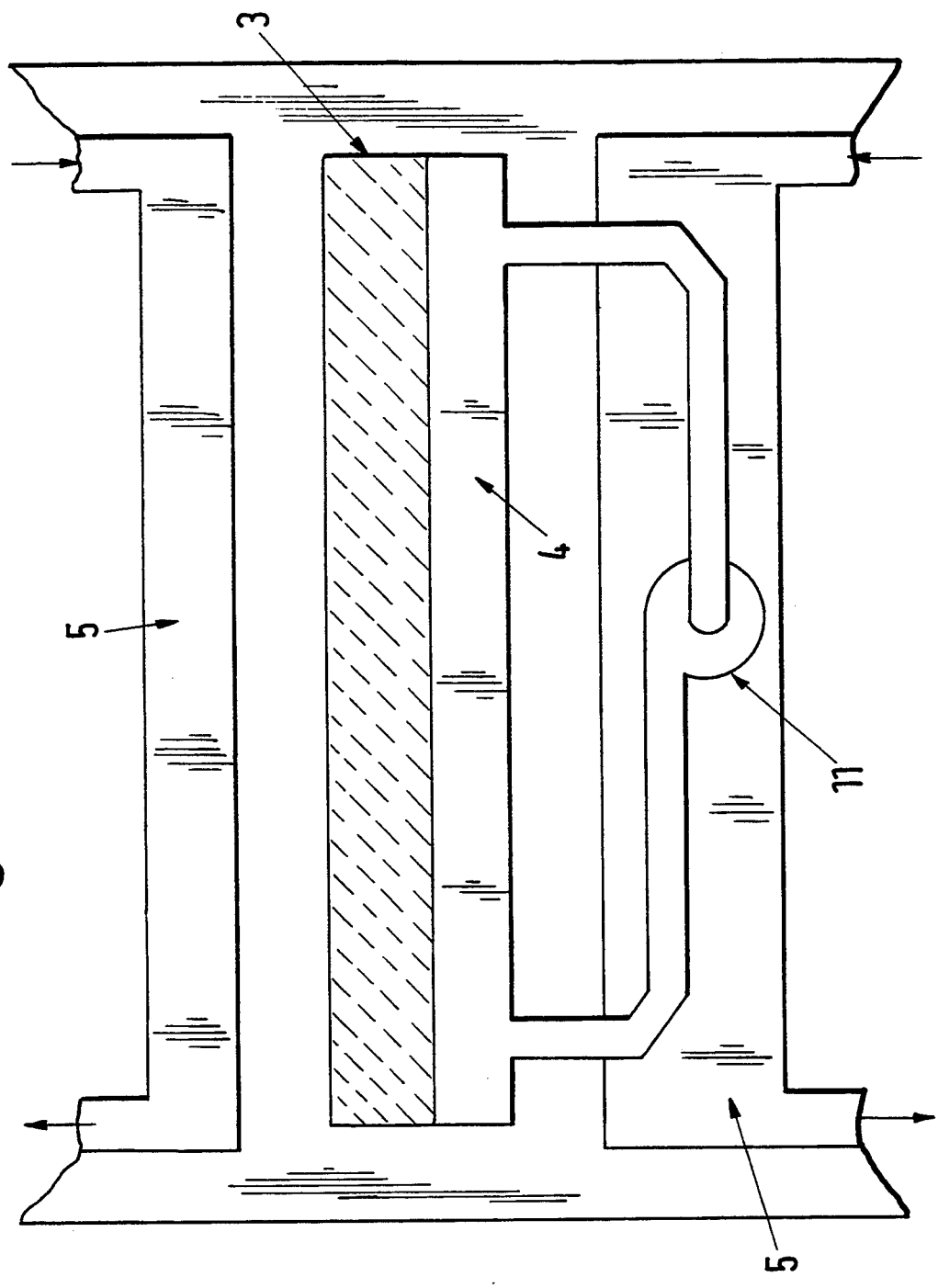
Figure 17:
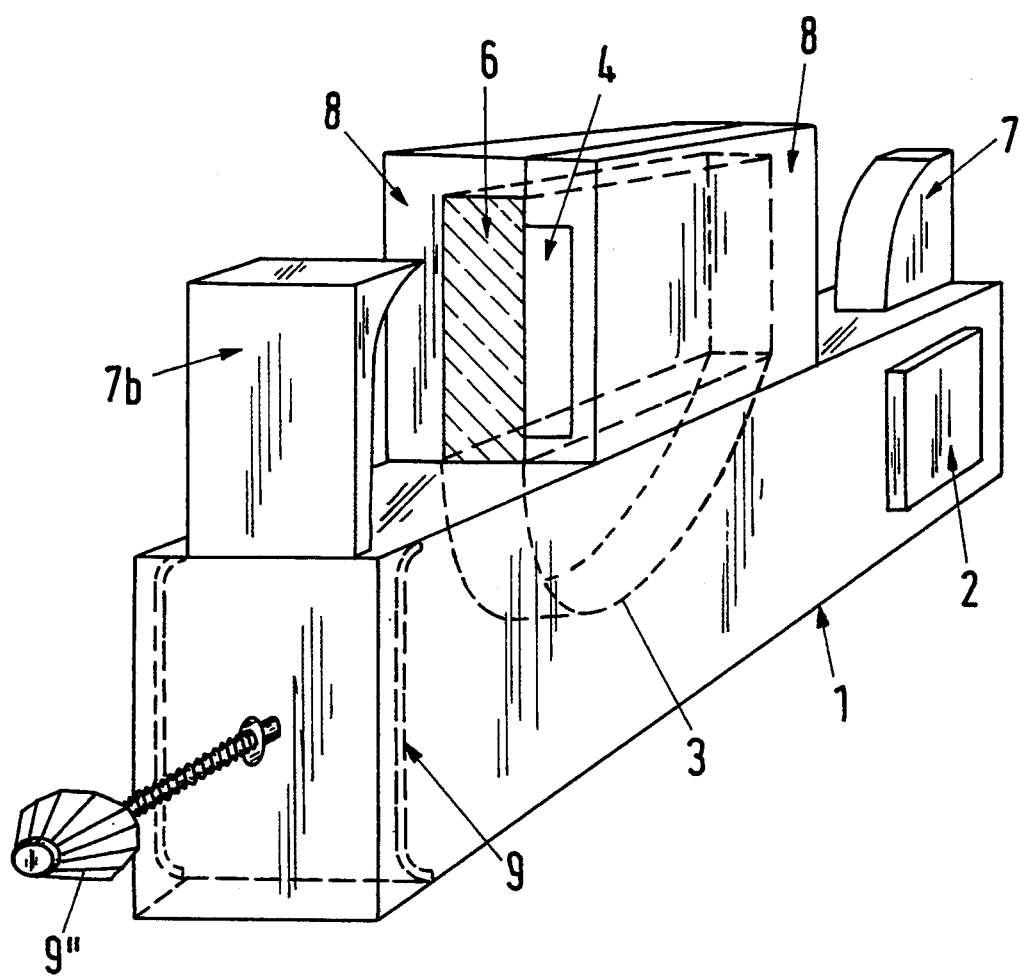

FIG. 5a shows a cross-section through the laser in accordance with FIG. 5,

FIG. 6 shows a longitudinal section through a laser in accordance with FIG. 5 having a modified waveguide, FIG. 6a shows a cross-section through the laser in accordance with FIG. 6, FIG. 7 shows a longitudinal section through a gas laser in accordance with FIG. 1 having short circuits serving the purpose of matching, FIG. 7a shows a cross-section through the laser in accordance with FIG. 7, FIG. 8 shows a gas laser in accordance with FIG. 7 having a modified waveguide, FIG. 8a shows a cross-section through the gas laser in accordance with FIG. 8, FIG. 9 shows a longitudinal section through a gas laser having respectively two discharge chambers arranged one above another, FIG. 9a shows a cross-section through the laser in accordance with FIG. 9, FIG. 10 shows a longitudinal section through a gas laser in accordance with FIG. 9 having a modified waveguide, FIG. 10a shows a cross-section through the gas laser in accordance with FIG. 10, FIGS. 11a and 11b show modifications of the discharge chambers having gas reservoirs, FIGS. 12a and 12b show modifications, corresponding to FIGS. 11a and 11b, for a multichannel system, FIG. 13 shows a cross-section through a gas laser having one output coupling from the long side of the rectangular waveguide, FIG. 14 shows a cross-section through a gas laser having three output couplings from the rectangular waveguide respectively to multi-channel systems, FIG. 15 shows a cross-section through a gas laser having four output couplings from the rectangular waveguide respectively with multi-channel systems, FIG. 16 shows a cross-section through a discharge chamber of the gas laser with circulation of the gas, and FIG. 17 shows a perspective diagrammatic view of a gas laser in accordance with FIG. 1.

FIG. 1 shows a rectangular waveguide 1 which is provided at one end with a magnetron as an RF generator 2. The microwave formed in the rectangular waveguide 1 is coupled out laterally from the rectangular waveguide via a waveguide 3. The waveguide 3 is formed such that it merges into the end walls of an aluminum housing 4'. The distance between the ends of the waveguide 3 corresponds to the length of the discharge chamber 4 which, as illustrated in FIG. 1a, is constructed as a narrow slit.

As FIG. 1a further illustrates, the aluminum housing 4' has empty chambers 5 in which water circulates for the purpose of cooling.

Located at the end faces of the discharge chamber 4 are windows 6, which are transparent to the laser radiation and downstream of which mirrors 7 are located, which together form an instable laser resonator.

The magnetron can have an output frequency of 2.45 GHz, for example, and be directly connected to an R26 rectangular waveguide 1. The dimensions of the rectangular waveguide 1 are such that only the fundamentals, specifically $TE_{10}$ waves, can be propagated. The electric field of the fundamental is then perpendicular to the longitudinal axis of the rectangular waveguide 1.

The excitation of the plasma is normally performed in such a way that it is necessary to provide a transition between the rectangular waveguide 1 and discharge chamber 4. The transition is formed by the waveguide 3 which projects into the rectangular waveguide 1 and is permitted to cause as few reflections there as possible. It must be possible to introduce the required wave into the discharge chamber 4 through the waveguide 3. Moreover, the microwave energy should be fed in uniformly over the entire length of the discharge chamber.

The waveguide consists of a dielectric whose material is preferably to have only a low reflective loss for the radiation of the laser, in order thus to keep the attenuation low. The waveguide 3 preferably consists of an $Al_2O_3$ ceramic.

In order to be able to introduce the microwave energy easily from the rectangular waveguide 1 into the discharge chamber 4 and to cause as few reflections as possible at the joint, the waveguide 3 has a special shape in the rectangular waveguide 1. [lacuna] shape represented in FIG. 1 can be described by an $e^{-x}$ function. The length of the waveguide 3 covers the entire length of the discharge chamber 4. Preferably, the length should be at least 2 $\lambda_g$, $\lambda_g$ being the wavelength in the rectangular waveguide 1. The longer the waveguide 3, the less reflection is caused at the joint. The thickness of the waveguide 3 can easily be determined by a field calculation. For example, for optimum waveguide characteristics the inserts of the $Al_2O_3$ ceramic are provided with smoothed surfaces and a very low residual roughness.

It is to be reckoned in general that a proportion of the gas in the plasma is decomposed and enters into other compounds. It is advantageous for the purpose of regeneration to provide a catalyst on the three sides of the discharge chamber 4, which is formed by the aluminum housing 4'. Layers made from metals such as gold or platinum, or oxide layers doped with these metals, are suitable as catalyst.

Because of the small slit width, an electric field strength which is higher by comparison with the rectangular waveguide 1 is formed in the slit-shaped discharge chamber 4. The discharge slit advantageously has a slit width of 1 mm to 2 mm and a height of approximately 20 mm.

A gas mixture of $CO_2:N_2:He:Xe$ having components of 15:10:70:5 is suitable as the laser gas, for example. The gas pressure can be set depending on the structure in order to achieve a maximum laser output power.

The waveguide laser is advantageously equipped with an instable resonator formed by the mirror 7. A relatively simple coupling out of the energy and an improved utilization of the entire width of the discharge slit is achieved in this case in conjunction with a high radiant intensity.

For the purpose of impedance matching, provision is made in the rectangular waveguide 1 of tuning screws 8 which are preferably inserted before the start of the junction.

In the following figures, the same reference numerals are used for the functionally identical parts, although the parts can be subjected to modifications.

FIG. 2 represents a modified exemplary embodiment, in which the waveguide 3 merges approximately rectilinearly from the end situated nearer to the RF generator 2 to the deepest point of immersion into the rectangular waveguide 1, and returns approximately rectilinearly by means of a kink to the other end, so that the waveguide is immersed in an approximately triangular shape into the rectangular waveguide. This construction of the asymmetrical waveguide 3 is also suitable for transmitting microwave energy with low reflective losses onto the discharge chamber 4.

FIG. 2a illustrates that no other changes are undertaken with respect to FIG. 1.

In the embodiment represented in FIGS. 3 and 3a, the waveguide 3 is constructed in an approximately quadrilateral shape, because it remains at the maximum depth of immersion in the rectangular waveguide 1 over an approximately rectilinear portion.

FIG. 4 shows a modification of the gas laser in accordance with FIG. 1, in which the waveguide 3 is widened outside the rectangular waveguide I in a stepped fashion.

Since the microwave energy is to be fed in uniformly over the entire length of the discharge chamber 4, the waveguide advantageously has the characteristics of a cavity resonator filled with dielectric, in which the electric field direction is preferably perpendicular to the discharge chamber 4.

If the waveguide 3 has the characteristic of the cavity resonator filled with a dielectric, the length of the waveguide 3, and thus also the length of the discharge chamber 4, is no longer limited by the length of the rectangular waveguide 1. FIGS. 5, 5a and 6, 6a therefore show exemplary embodiments having a lengthened waveguide, which projects into the rectangular waveguide 1 only over a part of its length. The difference between the embodiments in accordance with FIGS. 5, 5a and 6, 6a consist, in turn, in the stepped widening of the waveguide 3 outside the rectangular waveguide 1 in the embodiment in accordance with FIGS. 6, 6a.

In order to improve the matching of the microwaves between the rectangular waveguide 1 and discharge cheer 4, it is possible, as shown in FIGS. 7, 7a, to insert a displaceable short circuit 9 at the end of the rectangular waveguide 1 and a further displaceable short circuit 9' over the waveguide 3.

FIGS. 8, 8a correspond to FIGS. 7, 7a with the known modification in that the waveguide 3 has a width increased in a stepped fashion outside the rectangular waveguide.

The longer the discharge chamber 4, the better are the beam quality and efficiency of the laser. FIGS. 9, 9a show a multichannel system having respectively two discharge chambers 4 arranged one above another and two discharge chambers 4 arranged next to one another, which are connected one behind another for the laser radiation due to the deflecting mirror 7'. A deflected, possibly meandering laser beam is produced in this way between the mirrors 7.

FIGS. 10, 10a show the structure in accordance with FIG. 9 having the already mentioned modification of a larger width of the waveguide 3 outside the rectangular waveguide 1.

FIGS. 11a and 11b represent the two already described forms of the waveguide 3, the discharge chamber 4 arranged next to the waveguide being provided with a gas reservoir 10. The connection between the gas reservoir 10 and discharge chamber 4 is made possible by small holes (not represented).

Whereas FIGS. 11a and 11b show the structure of a single-channel system, FIGS. 12a and 12b respectively represent a corresponding multichannel system in which the discharge chambers 4 are respectively provided on both sides with a gas reservoir 10.

FIG. 13 shows an input [sic]coupling, possible in the structure according to the invention, of the microwave energy via the longer side of the rectangular waveguide 1, represented here for a multichannel system having a plurality of discharge chambers 4.

FIG. 14 shows a combined output coupling of the microwave energy from the rectangular waveguide 1 onto the two narrow sides and onto one long side, with the result that coupling out is performed with the aid of waveguides 3 onto three sides of the rectangular waveguide 1. One multichannel system is represented for each waveguide 3.

FIG. 15 shows a modification in which the coupling out is performed on all four sides of the rectangular waveguide 1.

FIG. 16 shows a design which serves the purpose of improved cooling of the laser gas. The laser gas is connected in this case to a gas circulation 11. The discharge chamber 4 is connected via feed pipes to the gas circulation, arranged in an empty chamber 5 through which water flows, in the form of a rotor. In this case, the rotor can be driven by the flow of the water in the cooling chamber.

FIG. 17 shows a perspective representation of the spatial arrangement of the rectangular waveguide 1 with its RF generator 2 and a short circuit 9 for tuning, which can be displaced with the aid of a screw 9". Also to be seen are the spatial arrangement of the closed waveguide 3 and the slit-shaped discharge chamber 4 arranged next thereto.

We claim:

1. A gas laser, in particular a $CO_2$ laser, having as a laser medium a gas which is excited to form a plasma by a supply of RF power, in particular having a form of microwave energy, RF waves being coupled into the laser medium (4) from a rectangular waveguide (1), characterized in that coupling in is performed with aid of a ribbon-shaped waveguide (3) which projects, into the rectangular waveguide (1).

2. A gas laser according to claim 1, characterized in that the coupling of the RF waves into the laser medium (4) is performed over an entire length of the plasma.

3. A gas laser according to claim 1, characterized in that the waveguide (3) projects with an asymmetrical shape into the rectangular waveguide (1), a maximum depth of immersion of the waveguide into the rectangular waveguide (1) being displaced on the length of the waveguide (3), starting from the middle thereof, towards the end averted from an RF generator (2).

4. A gas laser according to claim 3, characterized in that the waveguide (3) has a constant camber which extends from an end nearer the RF generator (2) with a lesser curvature to a maximum point of immersion of the waveguide (3) into the rectangular waveguide (1) than from the maximum point of immersion to the other end.

5. A gas laser according to claim 4, characterized in that a shape of the waveguide (3) approximately corresponds to an $e^{-x}$ function.

6. A gas laser according to claim 3, characterized in that the waveguide (3) extends approximately rectilinearly from the end nearer the RF generator (2) up to the maximum depth of immersion and returns approximately rectilinearly from the maximum depth of immersion to the other end.

7. A gas laser according to claim 6, characterized in that the waveguide (3) projects in an approximately triangular shape into the rectangular waveguide (1).

8. A gas laser according to claim 6, characterized in that the maximum depth of immersion is maintained over a certain length of the waveguide (3), with the result that it projects approximately in the shape of a quadrilateral into the rectangular waveguide (1).

9. A gas laser according to claim 1, characterized in that the waveguide (3) consists of a dielectrically active material and has a high optical quality.

10. A gas laser according to claim 9, characterized in that the waveguide consists of an $Al_2O_3$ ceramic.

11. A gas laser according to claim 9, characterized in that inserts of a dielectric are provided as a waveguide (3) with smoothed surfaces and a very low residual roughness.

12. A gas laser according to claim 1, characterized in that the discharge chamber (4) is formed in a metal block as a housing (4'), and in that the metal block has empty cheers (5) in which water circulates for the purpose of cooling.

13. A gas laser according to claim 1, characterized in that three sides of the discharge cheer (4), which are formed by the metal block (4'), are coated with a material selected from the group consisting of gold, platinum and oxide layers doped with these metals.

14. A gas laser according to claim 1, characterized in that the discharge chamber (4) is sealed and the laser gas is not subjected to any flow.

15. A gas laser according to claim 1, characterized in that the laser gas has a slow flow.

16. A gas laser according to claim 1, characterized in that the laser gas is a mixture of $CO_2:N_2:He:Xe$.

17. A gas laser according to claim 16, characterized in that the components of $CO_2:N_2:He:Xe$ are in the ratio of 15:10:70:5 in the laser gas.

18. A gas laser according to claim 1, characterized in that the discharge chamber (4) is constructed in the form of a slit.

19. A gas laser according to claim 18, characterized in that the width of the slit-shaped discharge chamber (4) is 1 to 2 min.

20. A gas laser according to claim 1, characterized by a displaceable short circuit (9) inserted at the end of the rectangular waveguide (1).

21. A gas laser according to claim 1, characterized in that it has an instable resonator (7).

22. A gas laser according to one of claim 1, characterized in that the RF frequency is between 1 GHz and 12 GHz.

23. A gas laser according to one of claim 1, characterized in that at least two discharge chambers (4) are arranged above or next to one another and the laser radiation is guided via deflecting devices (7') respectively from one discharge chamber (4) to the next.

24. A gas laser according to one of claim 1, characterized in that coupling out is performed via the waveguide (3) on a larger side of the rectangular waveguide (1).

25. A gas laser according to claim 1, characterized in that the RF energy is coupled out from the rectangular waveguide (1) on a plurality of sides of the rectangular waveguide (1) at the level which is identical with respect to the length.

26. A gas laser according to claim 25, characterized in that the coupling out is performed by means of waveguides (3) on all four sides of the rectangular waveguide (1).

* * * * *